(12) United States Patent
Kuwahara

(10) Patent No.: US 6,250,805 B1
(45) Date of Patent: Jun. 26, 2001

(54) LINEAR MOTION GUIDE UNIT

(75) Inventor: Hideki Kuwahara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/252,794

(22) Filed: Feb. 19, 1999

(30) Foreign Application Priority Data

Feb. 25, 1998 (JP) .................................................. 10-059122

(51) Int. Cl.⁷ .............................. E16C 29/06; E16C 33/72
(52) U.S. Cl. .................................................. 384/15; 384/45
(58) Field of Search .................................. 384/15, 43, 44, 384/45

(56) References Cited

U.S. PATENT DOCUMENTS

| 5,087,130 | * | 2/1992 | Tsukada | 384/15 |
| 5,209,575 | * | 5/1993 | Ohtake | 384/15 |
| 5,340,219 | * | 8/1994 | Agari | 384/15 |
| 5,358,336 | * | 10/1994 | Agari | 384/15 |
| 5,360,271 | * | 11/1994 | Agari | 384/15 |
| 5,362,155 | * | 11/1994 | Ichida | 384/15 |
| 5,464,288 | * | 11/1995 | Tanaka | 384/15 |

FOREIGN PATENT DOCUMENTS

| 6-049824 | 7/1994 | (JP) . |
| 6-051549 | 7/1994 | (JP) . |
| 7-071455 | 3/1995 | (JP) . |

\* cited by examiner

*Primary Examiner*—Richard M. Lorence
(74) *Attorney, Agent, or Firm*—Browdy and Neimark

(57) ABSTRACT

According to a linear motion guide unit of this invention, bottom seals may be simply attached to lower surfaces of both of casing and end caps. The bottom seals have core plates that are integrally provided at lengthwise opposing ends thereof with upright plates to be fitted into grooves formed on end surfaces of the end caps. The upright plates has a pair of jaws that extend widthwise the plates in opposite direction to each other so as to be engaged with opposing walls of the grooves on the end caps. The bottom seals are attached to a sliding element in such a manner that the upright plates are fitted into the grooves and the end seals are mounted to the casing through the end caps.

7 Claims, 5 Drawing Sheets

LINEAR MOTION GUIDE UNIT

BACKGROUND OF THE INVENTION

1. Field of the Invention

The present invention relates to a linear motion guide unit that is composed of a sliding element movable through rolling elements along a track rail in a sliding manner.

2. Description of the Prior Art

Conventionally a linear motion guide unit shown in FIGS. 11 to 13 is well known to those skilled in the art.

The prior linear motion guide unit, as shown in FIGS. 11 to 13, comprises a track rail 1 fixed to a mounting base 30 and having opposing lengthwise side surfaces 24 on which are formed raceway grooves 22, a sliding element, or slider 2, saddling on a track rail 1 so as to freely move along and with respect to the track rail. The slider 2 is composed of a casing 3 formed with raceway grooves 23 confronting the raceway grooves 22 of the track rail, rolling elements 7 running through raceways defined between the confronting raceway grooves 22, 23 so as to permit the slider to move relatively to the track rail, end caps 4 arranged on the end surfaces 19 opposed in the moving direction of the slider or lengthwise, one to each end surface, end seals 5 secured at 20 on the end caps 4 so as to close clearances between the track rail 1 and the slider 2, and bottom seals 26 arranged on the lower surfaces o f th e casing and the end caps 4. The casing 3 is further formed with threaded openings for attaching thereto other appliances, parts or the like by screws.

The bottom seals 26 are to cover the lower surfaces of the casing 3 and end caps 2 and further close clearances between the casing 3 and the end caps 4. The slider 2 saddles on the track rail 1 so as to smoothly move in a sliding manner by virtue of rolling elements of balls, or rollers, circulating along the raceway grooves 22 on the track rail 1. The rolling elements 7 may run in a circulating manner through raceways 29 defined between the confronting raceway grooves 22, 23, turnaround paths, not shown, formed in the end caps s and return paths 25 in the casing 3. Grease nipples 27 are provided at end surfaces 28 of the end seals 5 for supplying lubricant to the raceways 29 and the rolling elements 27.

The bottom seals 26 for the slider 2 are each provided at a lengthwise edge thereof with a lip, not shown, which extends along the lower surfaces of the casing 3 and end caps 4 so as to make tight contact with the opposing lengthwise side surfaces 24 of the track rail 1. The bottom seals 26 are secured to the casing 3 and end caps 4 with screw fastenings not shown in the accompanying drawings. As described just above, because the bottom seals have been conventionally attached to the casing 3 with the fastenings such as rivets, screws or the like, attachment and/or detachment of the bottom seals has been troublesome. Moreover, the bottom seals 26, although simple in shape and easy in production, have many disadvantages in which positional error is liable to happen in matching with the casing 3 and the track rail 1, and further the bottom seals are so thin as to be easy to deform due to external forces, thermal stress or the like. Hence, the conventional bottom seals 26 have a major problem in which they undergo deformation such as lengthwise distortion that is caused by swelling owing to lubricating oil, elongation and/or shrinkage owing to temperature change at the seals 26 resulting from the sliding motion of the slider 2 on the track rail 1, whereby the sealing performance deteriorates.

Disclosed in Japanese Utility Model Laid-Open No. 51549/1994 is dust-proof sealing means for linear motion guide units. In the linear motion guide unit in the above citation, the dust-proof bottom seals are fitted at their lengthwise major sections in the slots formed at the lower sides of the end caps. The bottom seals are further held at their opposing upright ends in the recesses formed on the end surfaces of the end caps. The recesses formed on the end caps each have a contour extending laterally outwardly at its inner part while the upright ends also extend at their distal ends externally outwardly so as to fit into the recesses.

Another types of the bottom seals have been further disclosed in, for example, Japanese Patent Laid-Open No. 71455/1995 and Japanese Utility Model Laid-Open No. 49824/1994. The prior bottom seals consist of core plates and elastic members adhering to the core plates and mounted to the lower sides of the casing and end caps with making use of spaces that are left for attaching the whetstones to grind the track rail. For mounting or incorporating the bottom seals to the end caps of the slider, the bottom seals have the upright brackets formed integrally with the core plate and, on the other hand, the end caps are provided with slots to be engaged with the brackets of the bottom seals. As an alternative, the bottom seals have hooks that are formed at the distal ends of the brackets towards lengthwise inwardly of the seals so as to make engagement with slits or holes in the end caps.

Meanwhile in the prior linear motion guide units, the bottom seals have been optionally mounted to the lower surfaces of the casing and end caps in accordance with the models of the units. The mounting of the bottom seals, however, has been recently recognized as a major problem. The cause of the problem resides in a rapidly increasing requirement for miniaturization of the linear motion guide units and therefore a tendency of the acceptable length of the end caps becoming shorter and shorter. This recent trend towards the shorter end cap in the slider is making it much more difficult to form the slots or holes in the end cap for engagement with, for example, the hooks that are provided by bending lengthwise inwardly the distal ends of the brackets of the bottom seals, as disclosed in the above-cited linear motion guide units.

In the dust-proof sealing means for linear motion guide units disclosed in the above-cited Japanese Utility Model Laid-Open No. 51549/1994, the end caps are each provided at its lower surface with slots and also at its end surface with the recess. The dust-proof bottom seals each have the opposing upright ends of a contour extending at their distal ends externally outwardly. On attaching the bottom seals to the end caps, the bottom seals are fitted in the slots at their lengthwise major sections. The bottom seals are in addition held at their opposing upright ends in the recesses. This cited mounting system of the bottom seals also disadvantageously requires the provision of slots and recesses in the end caps in order to help ensure the reliable mounting of the bottom seals.

SUMMARY OF THE INVENTION

An object of the present invention is to overcome the shortcomings as described above with reference to the prior art, and to provide a linear motion guide unit in which end caps are each provided at an end surface thereof with grooves while bottom seals each have upright plates provided with jaws that extend widthwise of the bottom seal in opposite directions to each other, the jaws are pressed into engagement with their associated opposing walls of the grooves on the end caps and the end caps are mounted together with the end seals to a casing whereby the bottom seals are simply incorporated in a sliding element with reliability and also may cope with the recent trend towards miniaturization.

In one aspect of the present invention a linear motion guide unit is disclosed which comprises; a track rail; a sliding element movable along and relatively to the track rail by virtue of rolling elements; the sliding element including a casing, end caps mounted on the casing at opposing ends lengthwise the casing, bottom seals attached to lower surfaces of the casing and end caps, and end seals arranged on end surfaces of the end caps so as to close clearances between the track rail and the end caps; the bottom seals being each composed of a core plate and an elastic sealing member adhered to the core plate; the core plates of the bottom seals being integrally provided at lengthwise opposing extremities thereof with upright plates to be fitted in grooves formed on the end surfaces of the end caps; and the upright plates having jaws that each extend widthwise of the plates in directions opposite to each other so as to make engagement with opposing walls of the grooves of the end caps.

In another aspect of the present invention a linear motion guide unit is disclosed, wherein the track rail is provided at lengthwise side surfaces thereof with first raceway grooves, the sliding element is provided with second raceway grooves confronting the first raceway grooves, and the rolling elements run through raceways defined between the first and second raceway grooves.

In a further aspect of the present invention a linear motion guide unit is disclosed, wherein the sealing members of the bottom seals each have a first sealing lip and a second sealing lip, the first sealing lip being made into a sliding contact with any one of the lengthwise side surfaces of the track rail to thereby close clearances between the track rail and the both the casing and end caps, and the second sealing lip making contact with the lower surfaces of the casing and end caps.

In another aspect of the present invention a linear motion guide unit is disclosed, wherein the upright plates of the bottom seals are held in the grooves on the end caps by fixing both the end caps and the end seals to the casing in such a manner that the end caps are abutted at their end surfaces against the end seals.

In another aspect of the present invention a linear motion guide unit is disclosed, wherein bending the lengthwise ends of the bottom seals forms the upright plates of the bottom plates.

In another aspect of the present invention a linear motion guide unit is disclosed, wherein the jaws of the upright plates are formed by making tapered distal ends of the upright plates, the end caps are made of elastic material, and jaws are forcibly pressed through the grooves formed in pillar sections of the elastic end caps into engagement with the grooves with rendering elastic deformation to opposing walls defining the grooves.

In another aspect of the present invention a linear motion guide unit is disclosed, wherein the opposing walls of the grooves on the end caps are formed with a pair of edges to be made into engagement with its associated jaw of any one of the upright plates.

In the linear motion guide unit of the present invention constructed as described above, the bottom seals include the upright plates each provided with an arrowhead-shaped distal end, which have jaws extending widthwise the plate in the opposite directions to each other. The jaws are made in engagement with the dovetail edges of the opposing walls of the grooves on the end surfaces of the end caps so as to span the grooves. This helps ensure the reliable mounting of the bottom seals at the lengthwise opposing ends thereof on the end caps. The bottom seals may be certainly held against the casing by the end seals, which are attached to the casing so as to sandwich the end caps. As apparent from the foregoing, the mounting structure of the bottom seals to the sliding element according to this invention may ensure that the sealing lips on the widthwise opposite sides of the bottom seals provide certainly the steady, reliable sealing performance at the clearances between the track rail and the slider as well as at the lower surfaces of the slider.

Moreover, as the upright plates are pressed upwardly through the grooves into the dovetail-recesses with the jaws of the upright plates rendering the opposing walls of the grooves elastically deformed, the bottom seals may be simply fitted in the grooves on the end caps. Slightly warping back the bottom seals so as to expand the distal ends of the upright plates may be alternatively employed to engage the upright plates with the grooves in the end caps. As a result, the jaws of the upright plates are made in snapping engagement with the edges of dovetail-recesses with no fear of falling off the end caps. With the upright plates being received in the grooves by the engagement of the jaws with the edges, the end seals are attached to the casing so as to sandwich the end caps whereby the bottom seals are certainly held to the end caps.

According to the liner motion guide units as described above, the upright plates of the bottom seals are brought into engagement at their laterally extended jaws with the dovetail edges in the grooves in a saddling manner and further held in position with the end seals secured to the casing. This structure helps ensure the simple, reliable mounting of the bottom seals to the end caps. In addition, the tapered distal ends of the upright plates makes easy the thrust motion of the upright plates into the grooves on the end caps, resulting in making easy and speedy the mounting process of the bottom seals to the end caps.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
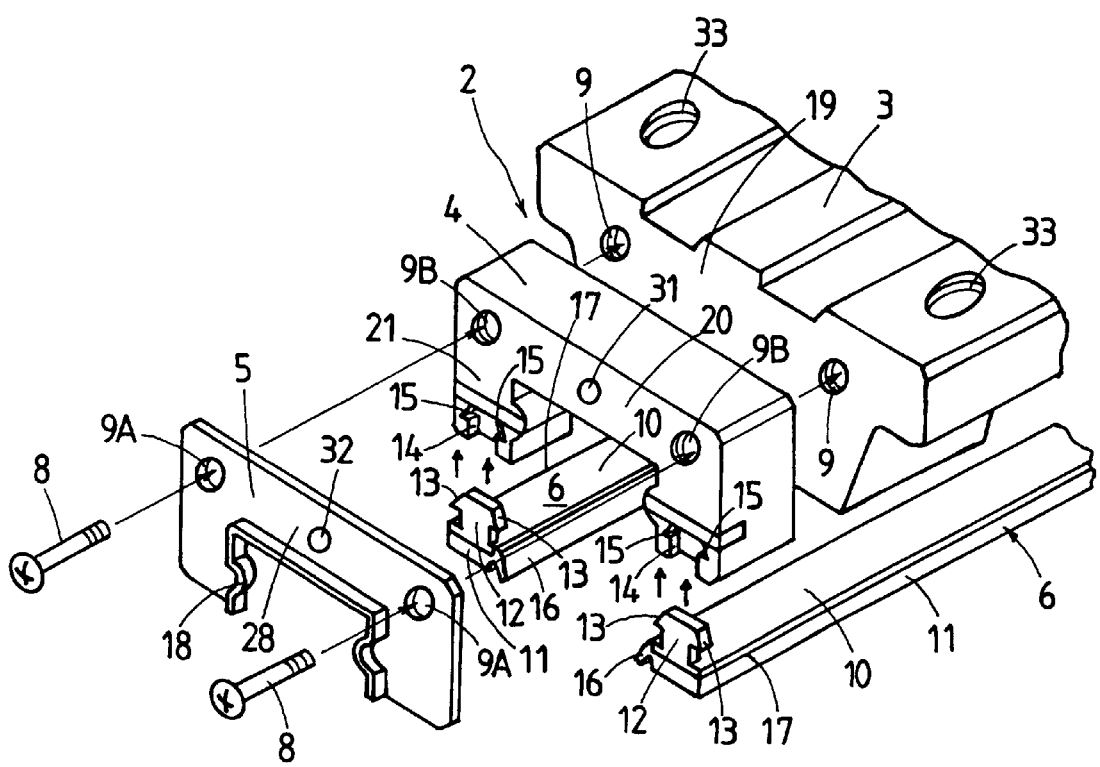
FIG. 1 is an exploded perspective view showing a preferred embodiment of a linear motion guide unit according to the present invention.
Figure 2:
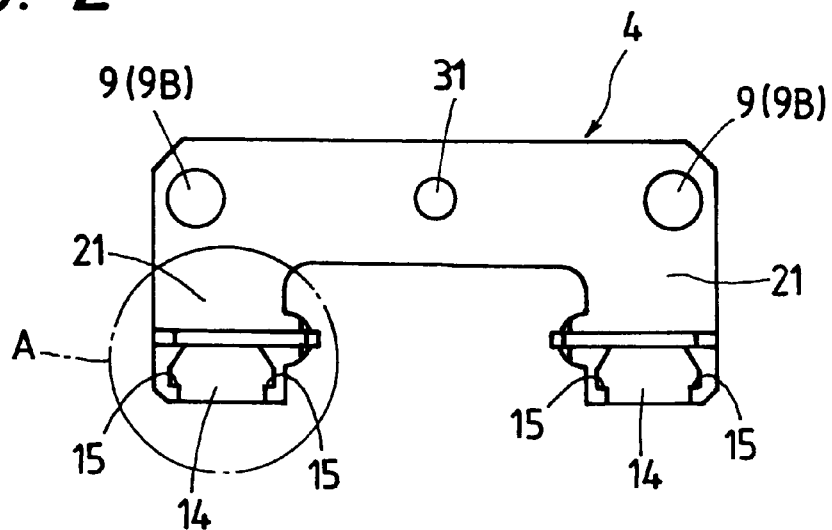
FIG. 2 is a front elevation view showing an end cap adapted to the linear motion guide unit shown in FIG. 1.
Figure 3:
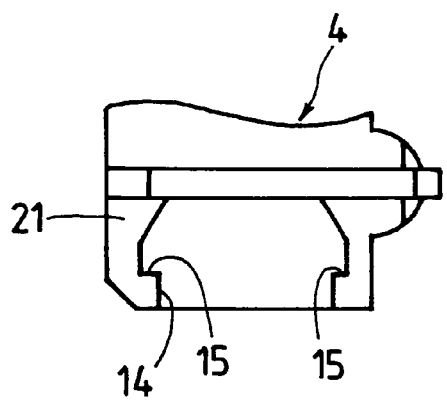
FIG. 3 is an enlarged fragmentary front elevation view of the end cap taken along the circle A in FIG. 2.

Referring now in detail to the drawings, the linear motion guide unit according to the present invention will be explained below. Similar reference characters designate similar elements or components throughout FIGS. 1 to 10 and FIGS. 11 to 13, and the previous description regarding the prior art will be applicable.

Figure 11:
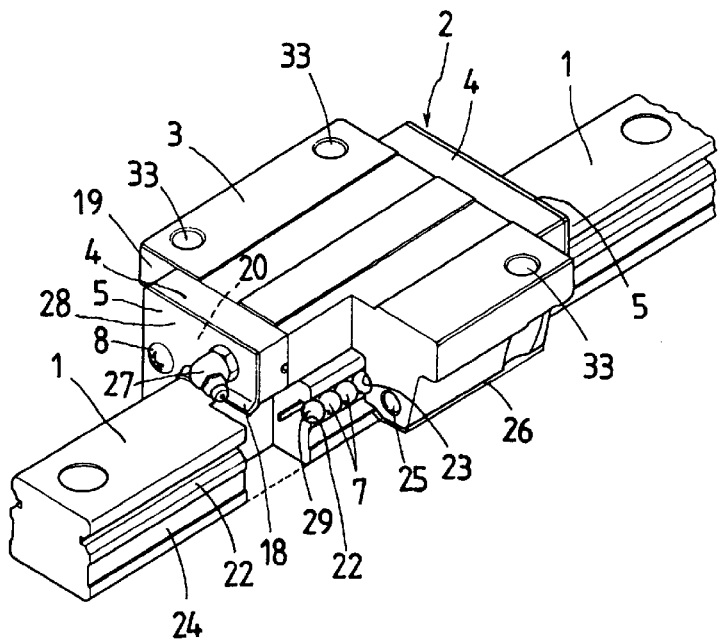
FIG. 11 is a perspective view, partially broken away, showing an exemplary prior linear motion guide unit.
Figure 12:
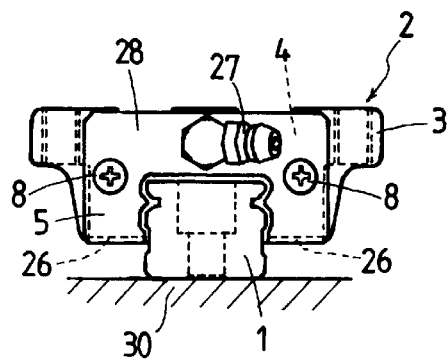
FIG. 12 is a front elevation view of the prior linear motion guide unit shown in FIG. 11.
Figure 13:
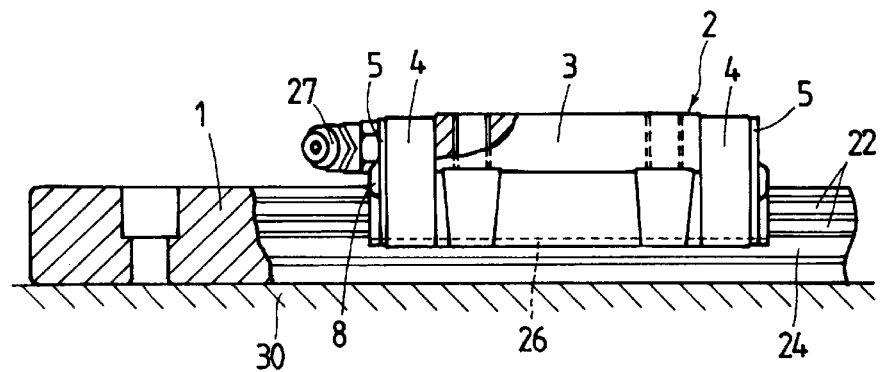
FIG. 13 is a side elevation view of the prior linear motion guide unit shown in FIG. 11.

The linear motion guide unit of the present invention primarily comprises the track rail 1 and the sliding element, or the slider 2, saddling on the track rail for sliding movement along the track rail 1 by virtue of the rolling elements 7 shown in FIG. 11. The slider 2 is composed of the casing 3, the end caps 4 mounted in contact with the end surfaces 19 opposing lengthwise the casing 3, one to each end surface, the bottom seals 6 arranged on the lower surfaces of the casing 3 and the end caps 4, and the end seals 5 arranged on surface 20 on the end caps 4 so as to close the clearances between the track rail 1 and the slider. The track rail 1, as apparent from FIG. 11, has the opposing lengthwise side surfaces 24 on which are formed raceway grooves 22, while the casing 3 is formed with the raceway grooves 23 confronting the raceway grooves 22 of the track rail 1. The rolling elements 7 are incorporated so as to run through raceways 29 defined between the confronting raceway grooves 22, 23.

The bottom seals 6 are each composed of a core plate 10 and a sealing member 11 of elastic material such as rubber, synthetic resin or the like, which is secured to the core plate 10. The sealing members 11 of the bottom seals are each provided with a first sealing lip 16 extending downwardly of the bottom seal 6 and a second sealing lip 17 extending upwardly of the bottom seal 6. The first sealing lip 16 makes a sliding contact with its associated lengthwise slide surface 24 of the track rail 1 thereby to close tightly the clearance between the track rail 1 and both the casing 3 and the end cap 4, while the second sealing lip 17 is brought into engagement with the lower surfaces of the casing 3 and end cap 4 so as to prevent the invasion of dust and contaminants. In addition, the end seals 5 have third sealing lips to help ensure the sealing performance against the track rail 1.

The end seals 5 are formed with grease bores 32 to be communicated with the grease nipples 27, shown in FIG. 11, for supplying lubricant and the end caps 4 have grease opening 31 intercommunicating with the grease bores 32. The end caps 4 and end seals 5 are respectively provided with holes 9A, 9B in alignment with each other, while the casing 3 has threaded holes 9 at locations corresponding to the holes 9A, 9B. The end caps 4 and end seals 5 are fixed to the casing 3 with driving screws 8 into the threaded holes 9 through the aligned holes 9A, 9B.

The linear motion guide unit of the present invention is characterized by the mounting system of the bottom seals 6 to the end caps 4. The bottom seals 6 each include the core plate 10 that is integrally provided at its lengthwise opposing ends with upright plates 12 to be fitted into recesses 14 formed in the end surfaces 20 of the end caps 4. Bending the lengthwise opposing ends of the bottom seals 6 may provide the upright plates 12 of the bottom seals 6. As an alternative, the upright plates 12 may be secured by, for example, welding to the bottom seals 6. Moreover, the end caps 4 each have pillar sections 21, each of which is formed with a groove 14 on its end surface confronting its associated end seal 5. The groove 14 extends upwardly from the lower surface of the end cap 4 into a dovetail-recess having widthwise or laterally extended edges 15, 15. In contrast, the upright plates 12 of the bottom seals 6 is formed at its tapered distal end in the contour of an arrowhead having a pair of jaws 13, 13 that may be made in engagement with the edges 15, 15. It will be thus understood that there is provided a fitting structure resembling a kind of the dovetail halving.

Figure 4:
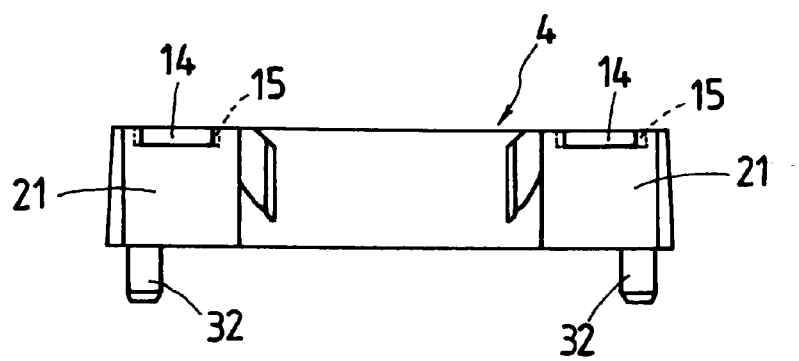
FIG. 4 is a bottom view of the end cap in FIG. 2.
Figure 5:
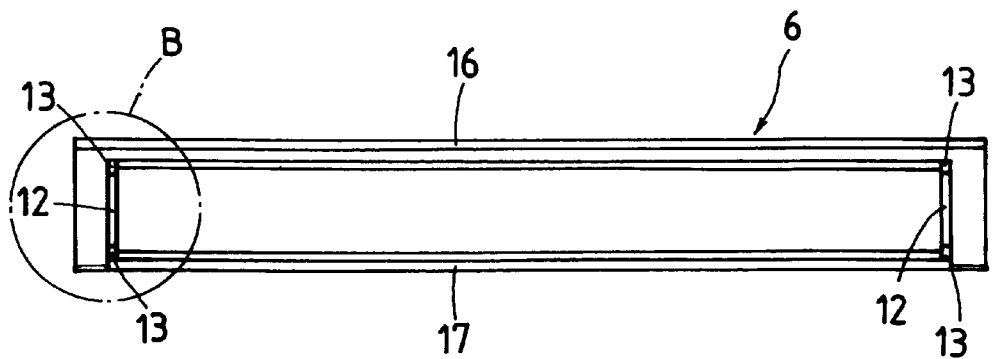
FIG. 5 is a plan view showing a bottom seal to be incorporated in the linear motion guide unit shown in FIG. 1.
Figure 6:
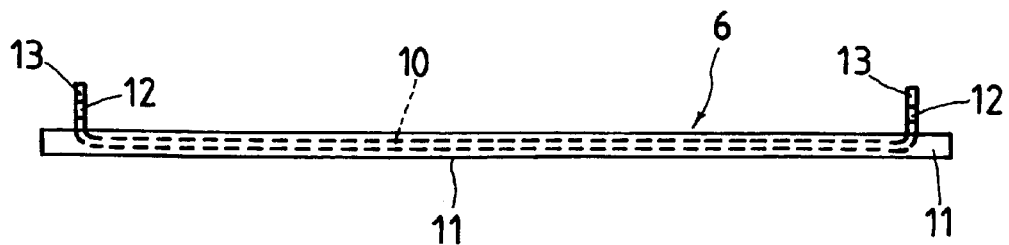
FIG. 6 is a side elevation view of the bottom seal in FIG. 5.
Figure 7:
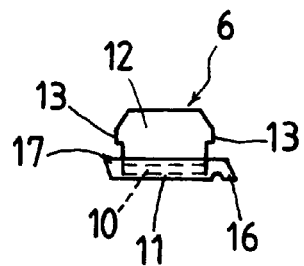
FIG. 7 is a front elevation view of the bottom seal shown in FIG. 5.
Figure 8:
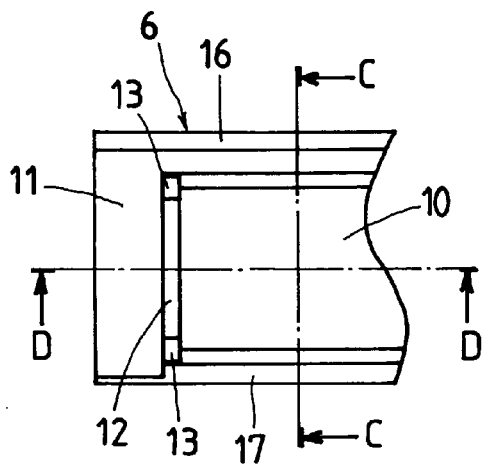
FIG. 8 is an enlarged fragmentary plan view of the bottom seal taken along the circle B in FIG. 5.
Figure 9:
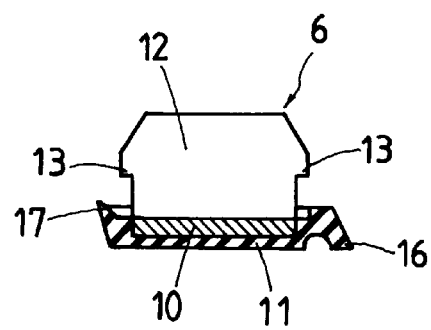
FIG. 9 is a section view of the bottom seal taken along the line C—C of FIG. 8.
Figure 10:
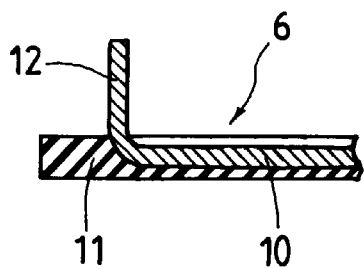
FIG. 10 is a section view of the bottom seal taken along the line D—D of FIG. 8.

In the fitting structure as described above, the bottom seals 6 will be attached to the end caps 4 by the steps explained hereinafter. When the upright plates 12 of the bottom plates 6 are pressed forcibly into the grooves 14 in the pillar sections 21 of the end caps 4, the arrowheads of the upright plates 12 may easily thrust through the grooves 14 into the dovetail-recesses with the jaws 13, 13 of the upright plates 12 rendering the opposing walls of the grooves 14 elastically deformed. Finally the jaws 13, 13 of the upright plates 12 are pressed into snapping engagement with the edges 15, 15 of dovetail-recesses whereby the dovetail joints are completed. As shown in FIG. 4 when the upright plates 12 are engaged in grooves 14, the entirety upright plates 12 are coplanar with the end surfaces 20 which further assists in miniaturizing the guide unit according to the invention. With the upright plates 12 being received in the grooves 14 by the engagement of the jaws 13, 13 with the edges 15, 15, the end seals 5 are abutted and secured on the end surfaces 20 of the end caps 4 with the screws 8 whereby the upright plates 12 are held in the grooves 14. Warping back the bottom seals 6 so as to expand the distal ends of the upright plates 12 may be alternatively employed to engage the upright plates 12 with the grooves 14 in the end caps 4, in place of forcibly pressing the upright plates 12 through the grooves 14.

According to the liner motion guide units as described above, the upright plates 12 of the bottom seals 6 each have a pair of the jaws 13, 13 to be engaged with a pair of the dovetail edges 15, 15 that are formed at the opposing walls of the associated groove 14 in any one of the end caps 4. Hence, the dovetail engagement of the jaws 13, 13 with the dovetail edges 15, 15 helps ensure the reliable mounting of the bottom seals 6 to the end caps 5. This eliminates the need for forming additional grooves at the lower surfaces of the end caps 4 to accommodate therein the bottom seals 6. The fitting structure of this invention has no need of an area for other grooves which would make the miniaturization of the end caps 4 more difficult. As the jaws 13, 13 are tapered so as to be easy to thrust through the grooves, the bottom seals 6 may be simply mounted to the end caps 4.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A linear motion guide unit comprising:
   a track rail;
   a sliding element movable along and relatively to the track rail by virtue of rolling elements;

the sliding element including a casing, end caps mounted on the casing at opposing ends lengthwise the casing, bottom seals attached to lower surfaces of the casing and end caps, and end seals arranged on end surfaces of the end caps so as to close clearances between the track rail and the end caps;

the bottom seals being each composed of a core plate and an elastic sealing member adhered to the core plate;

the core plates of the bottom seals being integrally provided at lengthwise opposing extremities thereof with upright plates to be fitted in grooves formed on the end surfaces of the end caps;

the upright plates having jaws that each extend widthwise of the plates in directions opposite to each other to engage the opposing walls of the grooves on the end surfaces of the end caps, wherein the opposing walls of the grooves on the end surfaces of the end caps are each formed with an edge which engages a corresponding jaw of the upright plates.

2. A linear motion guide unit constructed as defined in claim 1, wherein the track rail is provided at lengthwise side surfaces thereof with first raceway grooves, the sliding element is provided with second raceway grooves confronting the first raceway grooves, and the rolling elements run through raceways defined between the first and second raceway grooves.

3. A linear motion guide unit constructed as defined in claim 1, wherein the sealing members of the bottom seals each have a first sealing lip and a second sealing lip, the first sealing lip being made into a sliding contact with any one of the lengthwise side surfaces of the track rail to thereby close clearances between the track rail and both of the casing and end caps, and the second sealing lip making contact with the lower surfaces of the casing and end caps.

4. A linear motion guide unit constructed as defined in claim 1, wherein the upright plates of the bottom seals are held in the grooves on the end caps by fixing both the end caps and the end seals to the casing in such a manner that the end caps are abutted at their end surfaces against the end seals.

5. A linear motion guide unit constructed as defined in claim 1, wherein the upright plates of the bottom plates are formed by bending the lengthwise ends of the bottom seals.

6. A linear motion guide unit constructed as defined in claim 1, wherein the jaws of the upright plates are formed by making tapered distal ends of the upright plates, the end caps are made of elastic material, and jaws are forcibly pressed through the grooves formed in pillar sections of the elastic end caps into engagement with the grooves while rendering elastic deformation to opposing walls defining the grooves.

7. A linear motion guide unit constructed as define, in claim 1, wherein upright the plates including the jaws are coplanar with the end surfaces of the end caps when the upright plates are engaged in the grooves of the end caps.

* * * * *